United States Patent [19]
Roth

[11] 4,062,156
[45] Dec. 13, 1977

[54] EXTENSIBLE ROD

[75] Inventor: Günter Roth, Muelheim (Ruhr), Germany

[73] Assignee: Dornier System GmbH, Friedrichshafen, Germany

[21] Appl. No.: 724,328

[22] Filed: Sept. 17, 1976

[30] Foreign Application Priority Data

Jan. 30, 1976 Germany .............................. 2603488

[51] Int. Cl.² ...................... E04H 12/34; E04G 25/00
[52] U.S. Cl. ........................................ 52/111; 52/632; 343/903
[58] Field of Search ................. 52/632, 122, 239, 243, 52/678, 108, 118, 121, 726, 111; 343/903, 883

[56] References Cited

U.S. PATENT DOCUMENTS

| 1,676,616 | 7/1928 | Lowy | 52/632 X |
| 2,195,291 | 3/1940 | Zukor | 52/632 X |
| 2,493,787 | 1/1950 | Torretti | 343/903 |
| 2,711,918 | 6/1955 | Benson | 52/632 |
| 2,858,154 | 10/1958 | Johansson | 52/632 X |
| 2,925,743 | 2/1960 | Wise | 343/903 |
| 3,035,668 | 5/1962 | Langheck | 52/632 |
| 3,158,865 | 11/1964 | McCorkle | 343/883 |
| 3,280,527 | 10/1966 | Faust | 52/632 X |
| 3,546,834 | 12/1970 | Murawski | 52/632 |
| 3,963,037 | 6/1976 | Clark | 52/632 X |

Primary Examiner—Price C. Faw, Jr.
Assistant Examiner—Robert C. Farber
Attorney, Agent, or Firm—Hans Berman

[57] ABSTRACT

The telescoping elements of an extensible rod may be coupled sequentially to a coaxial, partly threaded spindle by respective internally threaded coupling members, each element being drivingly engaged with the spindle by a previously engaged, abuttingly coupled element. A yieldably resilient mounting for the coupling member or for one of two cooperating abutment members permits smooth engagement of the spindle threads with the coupling members.

13 Claims, 2 Drawing Figures

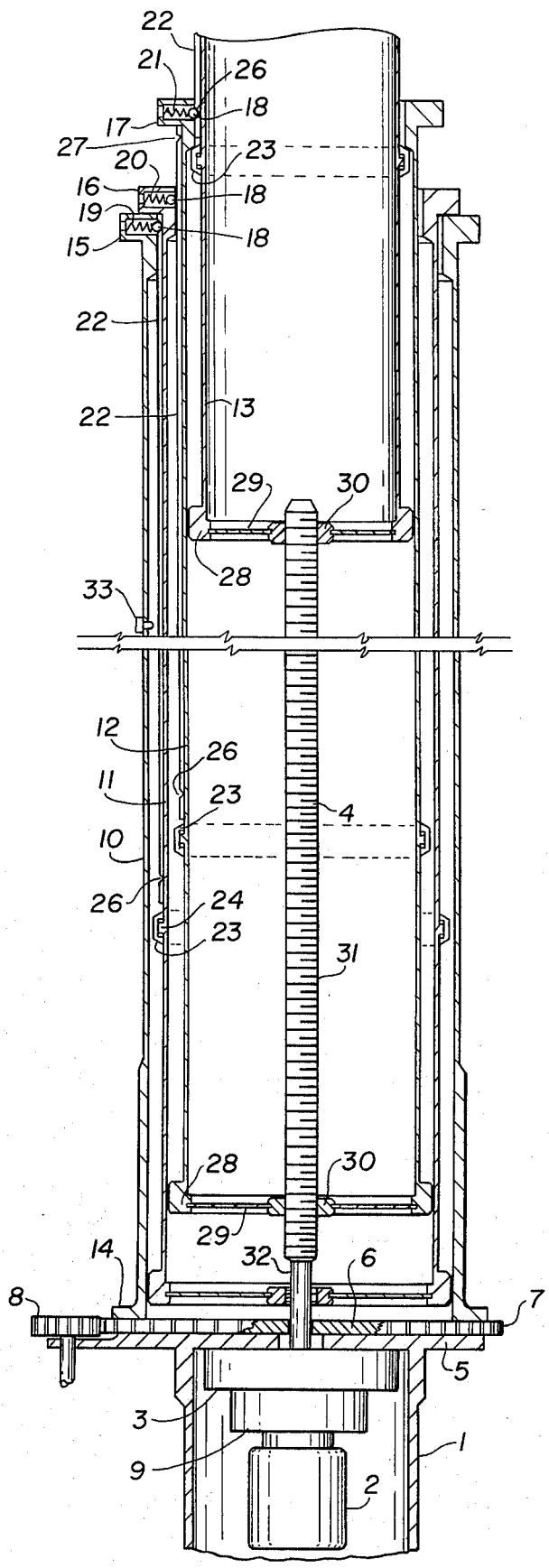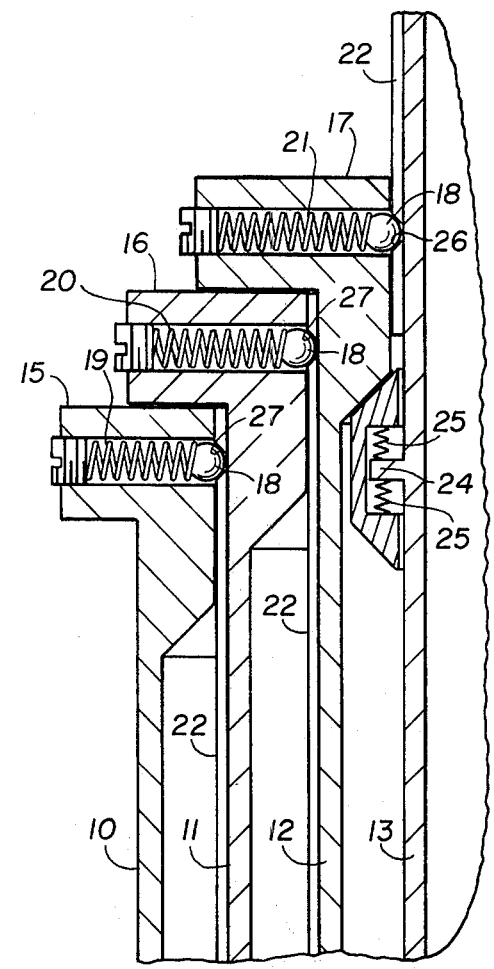
FIG.1
FIG.2

EXTENSIBLE ROD

This invention relates to extensible rods, and particularly to a rod whose length may be varied under remote control.

The term "rod", as employed herein, will be understood broadly to designate an elongated structural member of adequate strength to retain its shape under the stresses for which it is intended. An extensible rod may constitute the radio antenna of a motor vehicle or an arm of a remotely controlled manipulator, and many other applications will readily suggest themselves.

It is a primary object to this invention to provide an extensible rod which may be collapsed to a small fraction of its extended length and is rigid when extended, yet of relatively low weight.

With these and other objects in view, as will become apparent hereinafter, the extensible rod of the invention is equipped with a motor-driven, partly threaded drive spindle and includes a plurality of rod elements elongated in the direction of the spindle axis. Engaged guides on the elements guide relative, axial element movement. First couplings associated with respective elements sequentially couple the elements to the spindle and thereby move each element axially in response to the rotation of the spindle. The first coupling device includes an internally threaded coupling member matingly engageable by the threads of the spindle. A second coupling device can couple each element, while coupled to the spindle threads, to another element for joint axial movement until the coupling member associated with the other element is engaged by the threads. One of the coupling devices includes a yieldably resilient component which permits limited axial movement of the coupling member associated with the other element relative to the element already coupled to the spindle threads during joint axial movement of the two elements.

Other features, additional objects, and many of the attendant advantages of this invention will readily become apparent from the following detailed description of a preferred embodiment when considered in connection with the appended drawing in which:

FIG. 1 shows a manipulator arm of the invention in fragmentary elevational section on the axis of its drive spindle; and FIG. 2 illustrates a portion of the apparatus of FIG. 1 on a larger scale in a slightly different condition.

Referring to the drawing in detail, there is shown as much of the arm of a remotely controlled manipulator as is needed for an understanding of the invention. The arm is mounted on a housing 1 in which a reversible electric motor 2 is mounted in a conventional manner, not specifically illustrated, on a speed-reducing gear transmission 3 which connects the obsecured output shaft of the motor 2 to a coaxial spindle 4. The spindle passes through an opening in an end plate 5 of the housing carrying the transmission and serves as a pivot for a carrier plate 6 rotatably supported on the end plate 5. A gear rim 7 on the carrier plate 6 is drivingly engaged by a pinion 8 journaled in the housing 1 an driven by a non-illustrated motor. The output shafts of both motors are equipped with selsyn generators 9 whose output signals set remote instruments indicating the angular positions of the spindle 4 and of the carrier plate 6, only the generator on the motor 2 being shown.

Four tubes 10, 11, 12, 13, coaxial with the spindle 4, are mounted on the carrier plate 6. The bottom end of the outermost tube 10 is fastened to the carrier plate 6 by a flange 14. The top ends of the tubes 10, 11, 12 carry respective upper guide rings 15, 16, 17 which project radially outward and inward of the tubes. The non-illustrated top end of the innermost tube 13 may carry an instrument or a tool not directly relevant to this invention and not shown.

The rings 15, 16, 17 slidably engage the outer cylindrical faces of the tubes 11, 12, 13 respectively and thereby guide the tubes for coaxial relative movement. Each of several, circumferentially distributed, radial bores in each ring receives a spherical detent 18 and respective springs 19, 20, 21 which differ in length as the associated rings differ in radial width, and differ in stiffness, the shortest springs 19 on the outermost tube 10 being stiffer than the springs 20 of the tube 11 which in turn are stiffer than the springs 21. Only one of the detents associated with each guide ring is shown in FIG. 2. Axial ribs 22 on the outer faces of the tubes 11, 12, 13 are received with minimal clearance in grooves of the rings 15, 16, 17 and prevent significant angular movement of the four tubes about their common axis.

An abutment ring 23 is mounted at the lower end of each rib 22 near the bottom of each tube 11, 12, 13 by means of a radial flange 24 and circumferentially distributed, helical springs 25 covered by the abutment ring 23. The flange 24 and springs 25 permit, but resiliently resist, limited axial movement of the ring 23 on the associated tube. The radially extending abutment faces of the ring 23 converge in an outward direction so that the cross-sectional shape of the ring is trapezoidal. In the illustrated condition of the apparatus, the ring 23 on the innermost tube 13 abuttingly engages a conforming face of the ring 17 while the detent 18 on the tube 12 is received in a lower recess 26 of the tube 13. The detents 18 mounted on the tubes 10, 11 may be received in respective upper recesses 27 provided in the outer faces of the tubes 11, 12 near the guide rings 16, 17 to hold the rings 15, 16, 17 and the associated tubes in the respective rest positions illustrated in FIG. 2.

The lower ends of the tubes 11, 12, 13 carry respective lower guide rings 28 which slidably engage the inner faces of the tubes 10, 11, 12. Each lower guide ring 28 movably retains the outer circumference of a normally flat, annular spring steel diaphragm 29 whose inner circumference is similarly retained in a circumferential groove of a nut 30. The free end of the spindle 4 carries threads 31. The portion 32 of the spindle 4 adjacent the carrier plate 6 is free from threads and of smoothly cylindrical, reduced cross section over an exposed, axial length only slightly greater than the combined axial length of two nuts 30. In the position of the apparatus shown in FIG. 2, the nut 30 on the tube 13 is coupled to the spindle 4 by the threads 31 near the free end of the spindle 4 while the nuts 30 associated with the tubes 11, 12 freely receive the smooth spindle portion 32.

When the motor 2 turns the spindle 4 in a direction to lift the tube 13 from the illustrated position, the abutment ring 23 on the tube 13 and the guide ring 17 and detent 18 on the tube 12 couple the tubes 12, 13. The detent spring 20 on the tube 11 is overcome by the axial force transmitted from the spindle 4 to the coupled tubes 12, 13, and the tube 12 moves jointly with the tube 13 (FIG. 1) until the angularly fixed nut 30 on the tube 12 engages the lowermost turn of the threads 31 on the rotating spindle 4. In the event of an angular mismatch of the internal threads in the nut 30 on the tube 12 with the threads 31, the diaphragm 29 on the tube 12 and/or the springs 25 in the abutment ring 23 of the tube 13 yield to permit relative axail movement of the nut 30 relative to the driving tube 13 until the rotating threads 31 can engage the nut on the tube 12. The tube 11 is retained in the illustrated rest position by the detent spring 19 on the tube 10.

For a few revolutions of the spindle 14, both tubes 12, 13 are driven by the spindle. The nut on the tube 13 then slips from the top of the spindle, and the tube 13 thereafter is moved axially by the detent 18 on the tube 12. The spring 21 is chosen stiff enough to prevent release of the associated detent 18 from the tube 13 under the weight of the tube and of any nonillustrated devices which it may carry.

Unless the motor 2 is stopped first by remote control, the abutment ring 23 on the tube 12 abuttingly engages the upper guide ring 16 on the tube 11, the detent 18 of the latter drops into the lower recess 26 in the tube 12, and the nut 30 on the tube 11 is lifted into engagement with the threads 31 shortly before the tube 12 is disengaged from the top of the spindle 14. When subsequently the tube 11 is lifted from the illustrated position, its abutment ring 23 ultimately engages the upper guide ring 15 on the axially fixed tube 10 while the spings 19 on the latter drive detents 18 into lower recesses 26 on the tube 11.

A limit switch 33 on the outermost tube 10 is simultaneously engaged by the lower guide ring 28 of the tube 11 and deenergizes the motor 2 in a conventional manner, not shown, in the fully extended position of the manipulator arm. To guard against malfunctioning of the limit switch 33, the transmission 3 is provided with an overload-preventing, slipping clutch, conventional in itself and not specificlly illustrated. The nut 30 of the tube 11 remains engaged by the threads 31 when the rotation of the spindle 4 is terminated by the limit switch 33. A notch (not shown) in the abutment ring 23 on the tube 11 permits the ring to travel axially over the switch 33 without tripping the same.

When the motor 2 is energized to rotate in a direction to retract the manipulator arm toward its fully collapsed or retracted position, the tube 11 is moved toward the carrier plate 6, and the rotating spindle 4 overcomes the restraint of the spring 19 to release the associated detent 18. The lower guide ring 28 on the tube 11 releases the limit switch 33 which does not respond to the downward movement and does not prevent the reversed rotation of the motor 7. The tubes 11, 12, 13 move jointly inward of the tube 10, until the nut 30 on the tube 11 is released by the threads 31 on the spindle 4 shortly after the nut on the tube 12 is engaged by the threads. Ultimately, the tubes 11, 12, 13 are fully retracted and releasably retained in their retracted positions by detents 18 engaging respective upper recesses 27. The motor 2 is stopped in a manner not specifically shown by a relay actuated by the selsyn generator 9 in response to the return of the spindle 4 to its rest position.

In that position, the nuts 30 on the tubes 11, 12 loosely envelop the smooth portion 32 of the spindle 4 while the nut on the innermost tube 13 remains engaged by the threads 31 so that the spring 21, and only the spring 21, will be compressed to release the associated detent 18 and the tube 13, when the motor 2 is again energized.

The carrier plate 6 and the tube 10, 11, 12, 13 may be turned jointly relative to the spindle 4 by the pinion 8 through an angle necessary for the operation of the nonillustrated device attached to the innermost tube 13 in all axial positions of the tube.

The manipulator arm of the invention has been shown to have four coaxially telescoping, tubular elements in order not to crowd the drawing, but will be understood to be operable in an obvious manner with more or fewer elements. While the nuts 30 have been shown mounted on resilient diaphragms 29 for smooth engagement with the threads 31 on the spindle 4, the diaphragms may be replaced by rigid spiders if the springs 25 permit adequate axial movement of the abutment rings 23 on the associated tubes. Conversely, the abutment rings 23 may be fixedly mounted on the corresponding tubular elements of the manipulator arm if the diaphragm 29 may be deflected axially by the axial spacing of two successive turns of the threads 31.

Other variations in the illustrated embodiment of the invention will readily suggest themselves to those skilled in the art. It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of te appended claims.

What is claimed is:

1. An extensible rod comprising:
   a. a drive spindle having an axis and carrying threads about said axis;
   b. actuating means for rotating said spindle about said axis;
   c. a plurality of axially elongated rod elements;
   d. engaged guide means on said elements for guiding relative axial movement of said elements;
   e. first coupling means associated with each of said elements for sequentially coupling said elements to said spindle and thereby axially moving each element is response to said rotating of said spindle,
      1. said first coupling means including an internally threaded coupling member matingly engageable by said threads; and
   f. second coupling means for coupling each one of said elements, while coupled to said threads, to another element for joint axial movement until the coupling member associated with said other element is engaged by said threads,
      1. one of said coupling means including yielding resilient means permitting limited axial movement of the coupling member associated with said other element relative to said one element during said joint axial movement.

2. A rod as set forth in claim 1, wherein said spindle has an axial portion free from threads, said coupling member associated with said other element being formed with a bore axially slidably receiving said portion of said spindle during said joint axial movement prior to engagement by said threads.

3. A rod as set forth in claim 2, wherein said yieldably resilient means include a yieldably resilient mounting member interposed between said other element and the coupling member associated therewith.

4. A rod as set forth in claim 2, wherein said second coupling means include two cooperating abutment members respectively associated with said one element and said other element and engageable by relative axial movement of said elements, and said yieldably resilient means include yieldably resilient mounting means securing one of said abutment members to the associated element.

5. A rod is set forth in claim 2, wherein said elements are telescopically engaged with each other.

6. A rod is set forth in claim 5, wherein said guide means include two axially spaced guide members radially projecting from each element for movable engagement with a radially adjacent element, said second coupling means including an abutment member on said adjacent element engageable with one of said guide members by relative axial movement of said elements.

7. A rod as set forth in claim 6, wherein said abutment member is axially interposed between said two guide menbers in all relative positions of said elements.

8. A rod as set forth in claim 5, further comprising detent means yieldably coupling two of said elements to each other for joint axial movement in a predetermined relative axial position.

9. A rod as set forth in claim 1, wherein two of said elements are tubular, one of said tubular elements receiving a third element therein in telescoping relationship, first releasable detent means for connecting said tubular elements, and second releasable detent means for connecting said one tubular element to said third element, each detent means coupling the connected elements for joint axial movement and releasing the coupled elements in response to sufficient axial force applied to the coupled elements, the force sufficient for release of said detent means being greater than the applied force sufficient for release of said second detent means.

10. A rod as set forth in claim 1, further comprising means keeping at least one of said coupling members engaged by said threads in all relative axial positions of said elements.

11. A rod as set forth in claim 10, wherein said elements and said spindle are telescopically engaged, the rod further comprising means substantially preventing relative angular movement of said elements about said axis.

12. A rod as set forth in claim 1, further comprising a base supporting said spindle, said actuating means, and said elements, and turning for jointly turning said elements about said axis relative to said base.

13. A rod as set forth in claim 12, further comprising means for generating a signal indicative of the rotation of said spindle by said actuating means.

* * * * *

UNITED STATES PATENT OFFICE
CERTIFICATE OF CORRECTION

PATENT NO. : 4,062,156
DATED : December 13, 1977
INVENTOR(S) : Günter Roth

It is certified that error appears in the above-identified patent and that said Letters Patent are hereby corrected as shown below:

Column 4, line 48, change "yielding" to -- yieldably --.

Signed and Sealed this

Seventh Day of March 1978

[SEAL]

Attest:

RUTH C. MASON
Attesting Officer

LUTRELLE F. PARKER
Acting Commissioner of Patents and Trademarks